United States Patent
Yoo

(10) Patent No.: US 8,432,855 B2
(45) Date of Patent: Apr. 30, 2013

(54) METHOD FOR TRANSMITTING DATA USING HARQ

(75) Inventor: Hee Chul Yoo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 374 days.

(21) Appl. No.: 12/681,067

(22) PCT Filed: Nov. 26, 2008

(86) PCT No.: PCT/KR2008/006971
§ 371 (c)(1), (2), (4) Date: Mar. 31, 2010

(87) PCT Pub. No.: WO2009/069939
PCT Pub. Date: Jun. 4, 2009

(65) Prior Publication Data
US 2010/0215004 A1    Aug. 26, 2010

(30) Foreign Application Priority Data
Nov. 29, 2007 (KR) .................... 10-2007-0122768

(51) Int. Cl.
*H04W 4/00* (2009.01)
(52) U.S. Cl.
USPC ............ 370/328; 370/342; 370/343; 370/345
(58) Field of Classification Search .................. 370/329, 370/330, 335, 348, 350, 328, 342, 343, 345; 455/458
See application file for complete search history.

(56) References Cited

U.S. PATENT DOCUMENTS

| | | | |
|---|---|---|---|
| 8,045,513 B2 * | 10/2011 | Kim et al. | 370/329 |
| 8,169,964 B2 * | 5/2012 | Kolding et al. | 370/330 |
| 2006/0056343 A1 | 3/2006 | Hu et al. | |
| 2007/0133458 A1 * | 6/2007 | Chandra et al. | 370/329 |
| 2007/0153733 A1 * | 7/2007 | Kim et al. | 370/329 |
| 2007/0254679 A1 * | 11/2007 | Montojo et al. | 455/458 |
| 2009/0109906 A1 * | 4/2009 | Love et al. | 370/329 |

FOREIGN PATENT DOCUMENTS

| | | |
|---|---|---|
| JP | 2007-067748 | 3/2007 |
| WO | WO 2007/066900 A1 | 6/2007 |

* cited by examiner

*Primary Examiner* — Hassan Kizou
*Assistant Examiner* — Toan Nguyen
(74) *Attorney, Agent, or Firm* — McKenna Long & Aldridge LLP

(57) ABSTRACT

A method for transmitting data using a hybrid automatic repeat request (HARQ) is provided. The method includes receiving scheduling information, the scheduling information comprising information regarding a radio resource; transmitting data by using the radio resource; and retransmitting the data or transmitting new data by reusing the radio resource if a received scheduling change indicator indicates that the radio resource is reused. The scheduling change indicator is control information different from the scheduling information. Resources can be effectively used by decreasing an amount of radio resources required for scheduling information.

10 Claims, 9 Drawing Sheets

METHOD FOR TRANSMITTING DATA USING HARQ

This application is a national phase application based on International Application No. PCT/KR2008/006971, filed on Nov. 26, 2008, which claims priority to Korean Patent Application No. 10-2007-0122768, filed on Nov. 29, 2007, all of which are incorporated by reference for all purposes as if fully set forth herein.

TECHNICAL FIELD

The present invention relates to wireless communications, and more particularly, to a method for transmitting data using a hybrid automatic repeat request (HARQ).

BACKGROUND ART

In mobile communication systems, one base station (BS) generally provides services to a plurality of user equipments (UEs). The BS schedules user data on the plurality of UEs to transmit scheduling information to the UEs together with the user data. The scheduling information is control information regarding scheduling. A channel for carrying the control information is referred to as a control channel. A channel for carrying the user data is referred to as a data channel. The BS transmits the control information to each UE through a downlink control channel. Each UE finds control information of each UE by searching for the control channel, and processes data of each UE by using the control information.

The control information may have a variable size. That is, since different control information may be required by each UE, the size of control information may differ in each UE. In addition, even in the same UE, the size of required control information may change depending on time or frequency.

The control information may include scheduling information, information indicating whether data is for unicast, broadcast, or multicast, and multiple input multiple output (MIMO) control information. The scheduling information includes information regarding resource allocation for downlink or uplink transmission and modulation/coding information. The MIMO control information includes not only an acknowledgment (ACK)/negative-acknowledgment (NACK) signal indicating a success/failure of data transmission and a channel quality indicator (CQI) indicating downlink channel quality but also a precoding matrix index (PMI), a rank indicator (RI), etc.

If radio resources are consumed in a large amount to transmit a control signal, there may be a limit in increasing a transfer rate of the user data, and an excessive overhead may be caused in a control channel having limited radio resources. Therefore, it is preferable that the radio resources are required in a small amount when the control signal is transmitted. When the control signal is not properly transmitted, the BS or the UE cannot even know whether related user data is transmitted or not. Therefore, the control signal needs to be transmitted with high reliability. In a situation where limited radio resources are used, it can be seen that an amount of radio resources required for the control signal has a trade-off relation with transmission reliability of the control signal.

That is, for high reliability, it is preferable that a modulation and coding level of a downlink physical control channel is increased and more radio resources are required. However, since the radio resources are limited, the number of UEs that can be processed in one data transmission frame may be limited. On the other hand, a lower modulation and coding level has to be used to process more UEs in one data transmission frame, which may result in decrease in reliability of the control signal in a poor channel condition.

Accordingly, there is a need for a method capable of effectively using radio resources by decreasing an amount of radio resources required for scheduling information and capable of ensuring reliable transmission of control signals.

DISCLOSURE OF INVENTION

Technical Problem

The present invention provides a method for transmitting data using a hybrid automatic repeat request (HARQ).

Technical Solution

According to an aspect of the present invention, a method for transmitting data using a hybrid automatic repeat request (HARQ) is provided. The method includes receiving scheduling information, the scheduling information comprising information regarding a radio resource; transmitting data by using the radio resource; and retransmitting the data or transmitting new data by reusing the radio resource if a received scheduling change indicator indicates that the radio resource is reused. The scheduling change indicator is control information different from the scheduling information.

According to another aspect of the present invention, a method for transmitting data using scheduling information is provided. The method includes transmitting to a user equipment the scheduling information, the scheduling information comprising information regarding a radio resource to be allocated; transmitting the data to the user equipment by using the radio resource; generating a scheduling change indicator indicating whether the radio resource is changed; and transmitting the scheduling change indicator to the user equipment.

According to yet another aspect of the present invention, a method for transmitting data using scheduling is provided. The method includes receiving first HARQ data from a base station by using downlink scheduling information regarding radio resource allocation; transmitting an acknowledgment (ACK)/negative-acknowledgment (NACK) signal for the first HARQ data to the base station; receiving user equipment identification information from the base station; and receiving second HARQ data from the base station by using the downlink scheduling information.

ADVANTAGEOUS EFFECTS

Resources can be effectively used by decreasing an amount of radio resources required for scheduling information.

MODE FOR THE INVENTION

Figure 1:
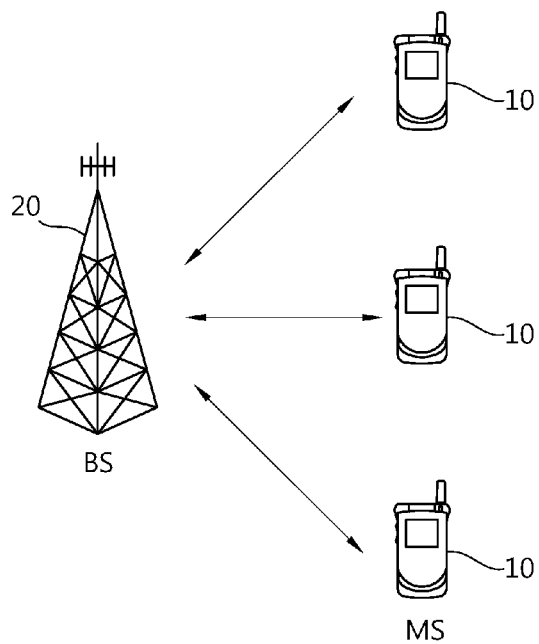
FIG. 1 shows a wireless communication system.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

A downlink represents a communication link from the BS 20 to the UE 10, and an uplink represents a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Downlink and uplink transmissions can be made using different multiple access schemes. For example, orthogonal frequency division multiple access (OFDMA) may be used for downlink transmission, and single carrier-frequency division multiple access (SC-FDMA) may be used for uplink transmission.

Examples of a downlink transport channel include a broadcast channel (BCH) for transmitting system information and a downlink-shared channel (DL-SCH) for transmitting user traffic or control messages. The user traffic of downlink multicast or broadcast services or the control messages can be transmitted on the DL-SCH or an additional downlink multicast channel (DL-MCH). The downlink transport channel is mapped to a downlink physical channel. Examples of the downlink physical channel include a physical downlink shared channel (PDSCH) mapped with the DL-SCH and a physical downlink control channel (PDCCH) for transmitting a control signal.

Examples of an uplink transport channel include a random access channel (RACH) for transmitting initial control messages and an uplink-shared channel (UL-SCH) for transmitting user traffic or control messages. The uplink transport channel is mapped to an uplink physical channel. Examples of the uplink physical channel include a physical random access channel (PRACH) mapped with the RACH and a physical uplink shared channel (PUSCH) mapped with the UL-SCH. The PUSCH is a physical uplink shared channel, and is used when the UE transmits data in uplink.

The PDCCH is a downlink physical control channel and transmits control information for the PUSCH or the PDSCH. An uplink grant that is scheduling information for uplink data transmission and a downlink grant that is scheduling information for downlink data transmission can be transmitted through the PDCCH. Herein, the scheduling information implies control information including radio resource allocation for transmitting downlink data from the BS to the UE or for receiving uplink data from the UE, a modulation and coding scheme (MCS), MIMO information, etc.

There is no restriction on the multiple access schemes used in the wireless communication system. The multiple access schemes may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. In these modulation schemes, signals received from multiple users are demodulated to increase capacity of the communication system. For clarity, the OFDMA-based wireless communication system will be described hereinafter.

The OFDM scheme uses a plurality of orthogonal subcarriers. Further, the OFDM scheme uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers. According to the OFDM scheme, complexity of the receiver can be reduced in a frequency selective fading environment of a broadband channel, and the spectral efficiency can be improved through selective scheduling in a frequency domain by utilizing channel characteristics which are different from one subcarrier to another. An OFDMA scheme is an OFDM-based multiple access scheme. According to the OFDMA scheme, a radio resource can be more efficiently used by allocating different subcarriers to multiple users.

Figure 2:
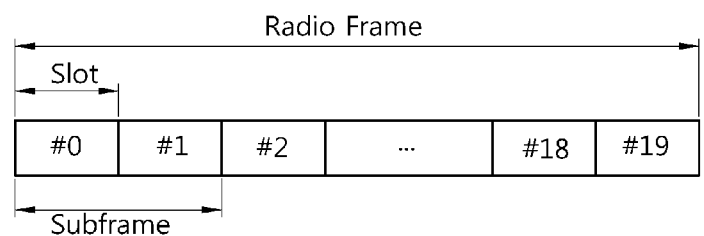
FIG. 2 shows an exemplary structure of a radio frame.

FIG. 2 shows an exemplary structure of a radio frame.

Referring to FIG. 2, the radio frame includes 10 subframes. One subframe includes two slots. Data can be transmitted on a subframe basis. Downlink or uplink scheduling is performed on a subframe basis. One slot may include a plurality of OFDM symbols in a time domain and at least one subcarrier in a frequency domain. One slot may include 7 or 6 OFDM symbols.

The radio frame structure is shown for exemplary purposes only. Thus, the number of subframes included in the radio frame, the number of slots included in the subframe, and the number of OFDM symbols and subcarriers included in the slot can change variously.

Figure 3:
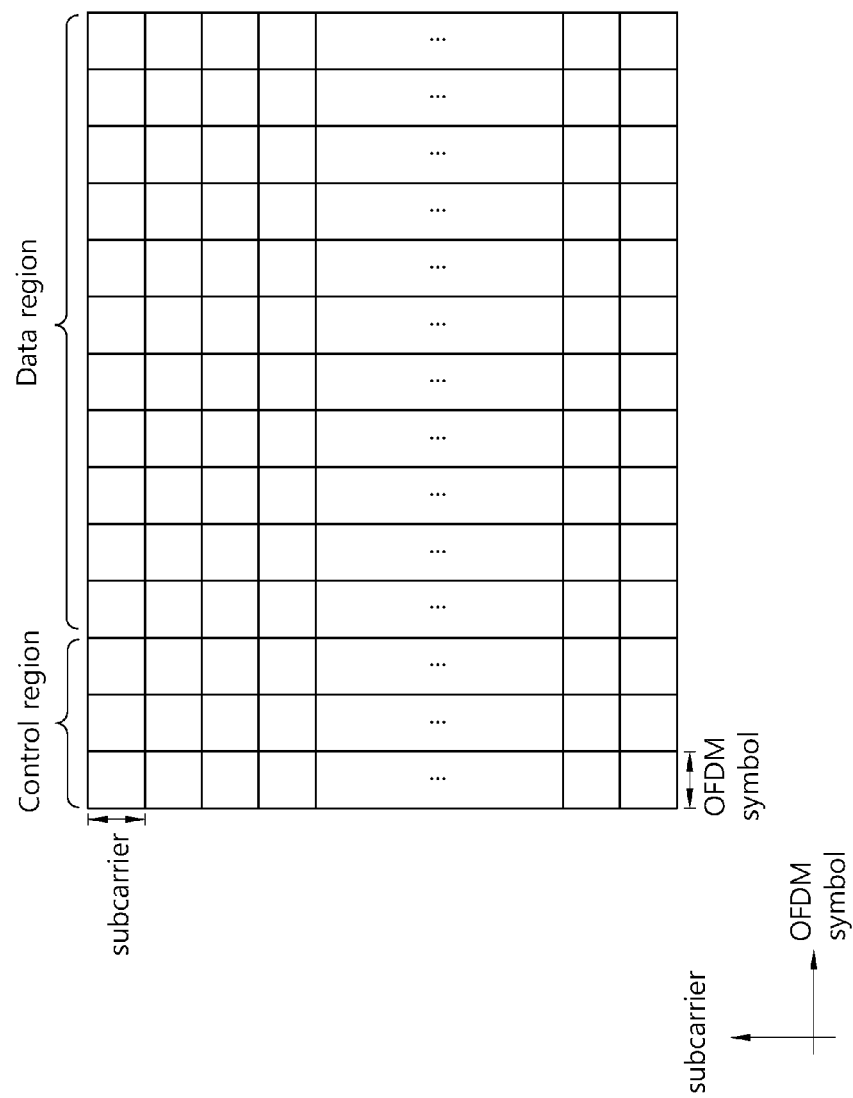
FIG. 3 is an exemplary structure of a subframe.

FIG. 3 is an exemplary structure of a subframe.

Referring to FIG. 3, one subframe includes 14 OFDM symbols in total. In a frequency domain, one OFDM symbol includes one or more subcarriers. One subcarrier and one OFDM symbol are also referred to as a resource element. In a downlink scenario, the number of subcarriers included in one OFDM symbol differs from one UE to another. For example, in an FDMA system, the number of subcarriers included in one OFDM symbol is equal to the number of subcarriers for a frequency bandwidth assigned to a UE.

A downlink subframe can be divided into 2 parts, that is, a control region and a data region. First 3 OFDM symbols can be assigned to the control region, and the remaining 11 OFDM symbols can be assigned to the data region. The number of OFDM symbols assigned to the control channel and the data channel on one subframe may be determined variously.

The control region is used to transmit only a control signal and is assigned to a control channel. The data region is used to transmit data and is assigned to a data channel. The control channel and the data channel can be configured with one subframe.

The control signal includes a plurality of signals other than the user data. That is, the control signal includes an acknowledgement (ACK)/negative-acknowledgement (NACK) signal, a channel quality indicator (CQI), a precoding matrix index (PMI), a rank indicator (RI), etc.

Hereinafter, hybrid automatic repeat request (HARQ) data denotes data transmitted using an HARQ scheme. The HARQ data may be a medium access control (MAC) protocol data unit (PDU) transmitted in a MAC layer. Of course, the HARQ data can be replaced with other synonymous terms.

Figure 4:
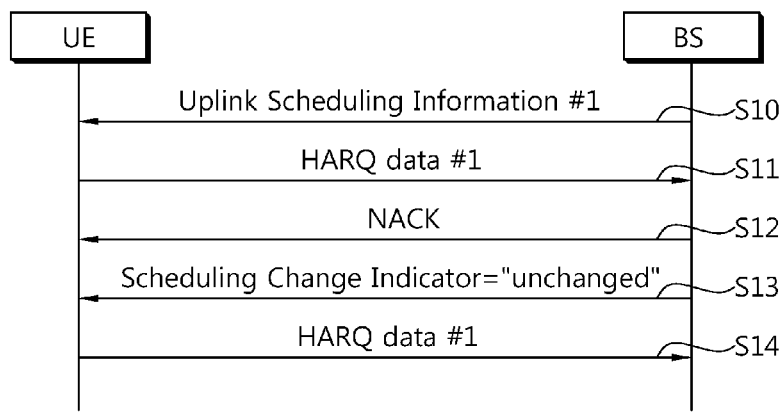
FIG. 4 is a flow diagram showing a method for transmitting uplink scheduling information according to an embodiment of the present invention.

FIG. 4 is a flow diagram showing a method for transmitting uplink scheduling information according to an embodiment of the present invention. When a transmitter transmits HARQ data, a receiver transmits an ACK/NACK signal in response thereto.

FIG. 4 shows a case where a UE transmits HARQ data in uplink and a BS transmits NACK in downlink after failing to receive the HARQ data.

Referring to FIG. 4, the BS transmits uplink scheduling information #1 to the UE (step S10). As described above, the uplink scheduling information #1 may be an uplink grant, and can be transmitted through a PDCCH that is a physical channel. The uplink scheduling information #1 may include at least one of a modulation and coding scheme, MIMO information, information regarding a resource allocation state, and an HARQ channel identifier (ID) that is information regarding a channel through which the HARQ data is transmitted.

When the BS periodically performs one set of HARQ processes, the HARQ channel ID is used to indicate an order of a specific HARQ process performed by a specific UE in the set of HARQ processes. The HARQ channel ID may also be referred to as an HARQ process number. Since a synchronous HARQ is used in uplink data transmission, scheduling is performed with a constant interval (i.e., the HARQ process number). On the other hand, in an asynchronous HARQ such as downlink transmission, since there is no guarantee that an HARQ process is periodically performed, the UE first checks for the HARQ channel ID assigned to the UE and then performs the HARQ process.

The UE transmits HARQ data #1 to the BS (step S11). The HARQ data #1 may include a redundancy version (RV) that is the number of retransmission attempts. When HARQ data is initially transmitted, RV=0.

The BS transmits NACK (step S12). When the BS transmits NACK, the UE retransmits the HARQ data #1 according to the previously received uplink scheduling information. That is, when the BS transmits NACK, instead of additionally transmitting new scheduling information to the UE, the BS allows the UE to transmit the HARQ data #1 according to the previous scheduling information.

The BS transmits a scheduling change indicator (SCI) by setting the SCI to 'unchanged' (step S13). The SCI is an indicator for indicating whether scheduling information transmitted by the BS is changed (or whether a previously allocated radio resource is reused). That is, if the BS is supposed to transmit scheduling information that is the same as the previously transmitted scheduling information, only the SCI is transmitted which indicates that previous scheduling information is 'unchanged and scheduling information is not additionally transmitted. In this case, the UE transmits uplink data by reusing a radio resource according to the previously received scheduling information, or receives downlink data. Otherwise, if new scheduling information to be transmitted by the BS is different from the previously transmitted scheduling information, the SCI is transmitted by setting the SCI to 'changed' while transmitting the new scheduling information.

Since the SCI indicates two states (i.e., 'changed' or 'unchanged') of the scheduling information, the SCI can be mapped to 1-bit information. That is, if the SCI is 0, it may indicate that the scheduling information is 'unchanged', and if the SCI is 1, it may indicate that the scheduling information is 'changed'. A state indicated by 0 or 1 can be modified according to a system.

The SCI is a sort of control information, and can be transmitted by being included in the scheduling information. In this case, the SCI can be defined by a downlink control information (DCI) format of a downlink grant or an uplink grant. That is, to indicate whether uplink scheduling information is unchanged or changed, the BS can transmit the SCI to the UE in a new DCI format.

Alternatively, the SCI can be transmitted through a control channel provided independently from a control channel through which scheduling information is transmitted. When the SCI is transmitted through an additional downlink control channel, the additional downlink control channel will hereinafter be referred to as a physical uplink scheduling indicator channel (PUSICH).

The PUSICH through which the SCI is transmitted can be configured as follows. Since 'changed' or 'unchanged' can be indicated using one bit for one UE, the PUSICH can be configured with bits corresponding to the number of UEs that can be processed in one transmission time interval (TTI). For example, when the BS provides services to 8 UEs, the PUSICH can be configured with 8 bits. In bit configuration, the UEs are identified by performing bit-shifting on a demodulation reference signal (DMRS) index included in an uplink grant field according to Equation 1 below. In Equation 1, PUSICH_UE indicates a PUSICH bit assigned to one UE.

MathFigure 1

[Math.1]

$$PUSICH\text{-}UE(n) = 1 << n, \text{ where n=DMRS iNdex}$$

In addition, the PUSICH can be assigned to a specific region in a frame such as in a physical control format indicator channel (PCFICH) and a physical hybrid-ARQ indicator channel (PHICH). Scheduling of the PUSICH is performed on an HARQ channel ID basis determined by a system.

Upon receiving the NACK and the SCI, the UE retransmits the HARQ data #1 on the basis of the previously received uplink scheduling information #1 (step S14). Since the UE receives the NACK, the UE can retransmit the HARQ data #1 according to the previously received uplink scheduling information #1 without having to decode a channel (e.g., PDCCH) for transmitting uplink scheduling information and a channel (e.g., PUSICH) for transmitting the SCI. In this case, RV=1 is included in the retransmitted HARQ data #1.

Figure 5:
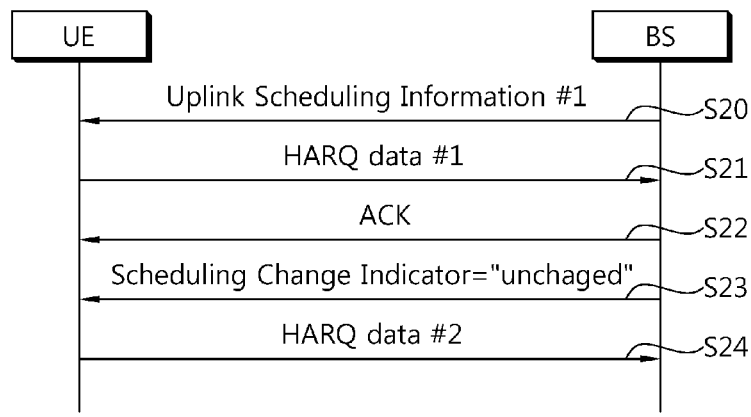
FIG. 5 is a flow diagram showing a method for transmitting uplink scheduling information according to another embodiment of the present invention.

FIG. 5 is a flow diagram showing a method for transmitting uplink scheduling information according to another embodiment of the present invention. FIG. 5 shows a case where a UE transmits HARQ data in uplink and a BS transmits ACK in downlink after successfully receiving the HARQ data and a case where the same uplink scheduling information is generated.

Referring to FIG. 5, the UE receives uplink scheduling information #1 from the BS (step S20). As described above, the uplink scheduling information #1 may be an uplink grant, and can be transmitted through a PDCCH that is a physical channel. The uplink scheduling information #1 may include at least one of a modulation and coding scheme, MIMO information, information regarding radio resource allocation for data transmission, and an HARQ channel ID that is information regarding a channel through which the HARQ data is transmitted.

The UE transmits HARQ data #1 to the BS (step S21). The HARQ data #1 may include a redundancy version (RV) that is the number of retransmission attempts. When HARQ data is initially transmitted, RV=0.

The UE receives ACK from the BS (step S22). Unlike in the case where NACK is transmitted, when the BS transmits ACK, in principle, the BS transmits new uplink scheduling information to the UE and allows the UE to transmit HARQ data on the basis of the new uplink scheduling information. However, when modulation and coding information assigned to the UE, radio resource allocation information, etc., are unchanged and thus equal to those of previous information, the BS can generate uplink scheduling information that is the same as previously transmitted uplink scheduling information. In this case, instead of transmitting the same uplink scheduling information by the BS, uplink scheduling information to be used by the UE can be indicated using a minimum number of bits.

The UE receives an SCI which is set to 'unchanged' (step S23). If the SCI indicates 'unchanged', it implies that uplink scheduling information (e.g., information regarding radio resource allocation), which is required for the UE to transmit HARQ data #2, is the same as the previously received uplink scheduling information #1. In this case, without having to additionally transmit the uplink scheduling information #1, the BS transmits only the SCI indicating 'unchanged' and thus allows the UE to transmit HARQ data #2 by using the uplink scheduling information #1 previously received by the UE.

When the BS continuously transmits ACK, it may imply that a channel state is good as much as the number of times of transmitting ACK. According to the conventional technique, in this case, the BS has to continuously transmit scheduling information irrespective of whether the same or different scheduling information is transmitted. This causes not only an excessive overhead on a limited radio resource but also unbalance since a UE having a good channel condition has a radio resource that is the same as that of a UE having a poor channel condition and requiring a robust modulation and coding scheme. In addition, the number of UEs that can be processed in one TTI is limited.

Therefore, it is preferable to transmit only minimum control information (i.e., SCI) rather than unnecessarily wasting resources to transmit the same scheduling information to the UE having the good channel condition, so that more resources can be allocated to the UE having the poor channel condition. Further, when only the SCI is transmitted, resources required for scheduling information can be used to process data of more UEs. That is, since the scheduling information can be reported to the UE by using the minimum control information, resources can be effectively used.

Upon receiving ACK, the UE decodes a downlink control channel (e.g., PUSICH) through which the SCI is transmitted and then transmits the HARQ data #2 that is next data of the HARQ data #1 on the basis of the previously received uplink scheduling information #1 (step S24). The HARQ data #2 is new HARQ data that is initially transmitted, and thus RV=0 in this case.

Figure 6:
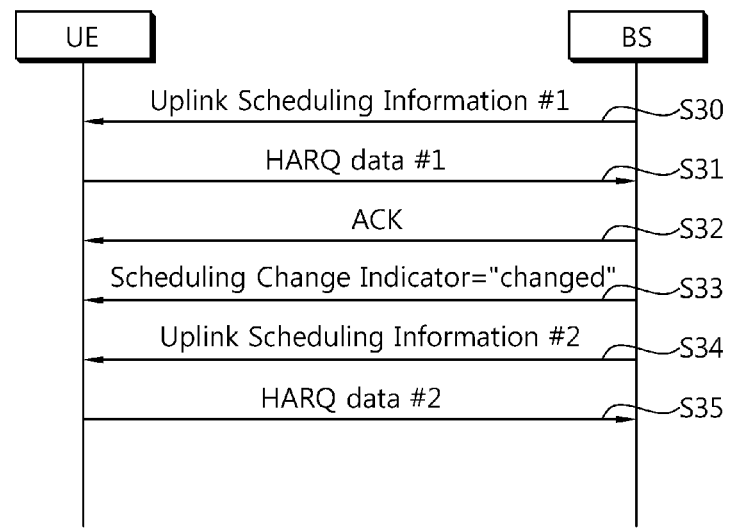
FIG. 6 is a flow diagram showing a method for transmitting uplink scheduling information according to another embodiment of the present invention.

FIG. 6 is a flow diagram showing a method for transmitting uplink scheduling information according to another embodiment of the present invention. FIG. 6 shows a case where a UE transmits HARQ data in uplink and a BS transmits ACK in downlink after successfully receiving the HARQ data and a case where new uplink scheduling information is changed and thus different from previous uplink scheduling information.

Referring to FIG. 6, the BS transmits uplink scheduling information #1 to the UE (step S30). As described above, the uplink scheduling information #1 may be an uplink grant, and can be transmitted through a PDCCH that is a physical channel. The uplink scheduling information #1 may include at least one of a modulation and coding scheme, MIMO information, information regarding a resource allocation state, and an HARQ channel ID that is information regarding a channel through which the HARQ data is transmitted.

The UE transmits HARQ data #1 to the BS (step S31). The HARQ data #1 may include a redundancy version (RV) that is the number of retransmission attempts. When the HARQ data #1 is initially transmitted, RV=0.

The BS transmits ACK (step S32). When the BS transmits ACK, the BS transmits new uplink scheduling information to the UE and allows the UE to transmit HARQ data on the basis of the new uplink scheduling information. However, when modulation and coding information assigned to the UE, a resource allocation state, etc, are changed from those of previous information, the BS transmits an SCI by setting the SCI to 'changed' (step S33). If the SCI indicates 'changed', it implies that uplink scheduling information #2, which is required for the UE to transmit HARQ data #2, is different from the previously received uplink scheduling information #1. In this case, the BS transmits the new uplink scheduling information #2 together with the SCI indicating 'changed' (step S34).

Upon receiving the SCI indicating 'changed' and the uplink scheduling information #2, it is preferable that the UE first decodes the SCI and then decodes the uplink scheduling information #2. This is because there is no need to decode the uplink scheduling information #2 when the SCI indicates 'unchanged'. The UE transmits the HARQ data #2 that is next data of the HARQ data #1 according to the new uplink scheduling information #2 (step S35).

Figure 7:
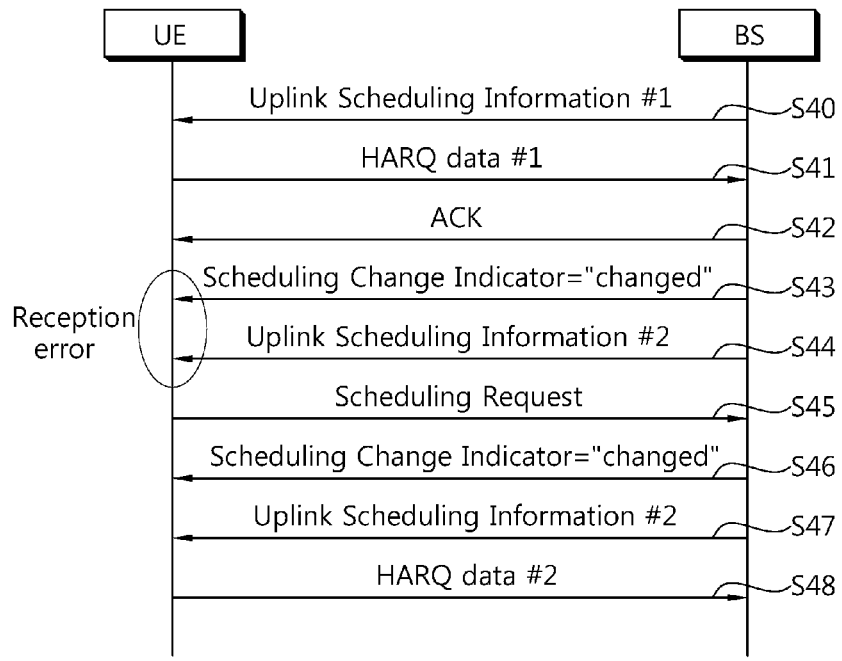
FIG. 7 is a flow diagram showing a method for handling an error of an SCI according to an embodiment of the present invention.

FIG. 7 is a flow diagram showing a method for handling an error of an SCI according to an embodiment of the present invention. The method for handling the error of the SCI will be described hereinafter only for a case where the UE receives ACK from the BS. FIG. 7 shows an error handling method in a case where an error occurs in both the SCI and the uplink scheduling information.

Referring to FIG. 7, the BS transmits uplink scheduling information #1 to the UE (step S40). As described above, the uplink scheduling information #1 may be an uplink grant, and can be transmitted through a PDCCH that is a physical channel. The uplink scheduling information #1 may include at least one of a modulation and coding scheme, MIMO information, information regarding a resource allocation state, and an HARQ channel ID that is information regarding a channel through which the HARQ data is transmitted.

The UE transmits HARQ data #1 to the BS (step S41). The BS successfully receives the HARQ data #1 and thus transmits ACK to the UE (step S42). The BS transmits the SCI by setting the SCI to 'changed' so as to indicate a change of the uplink scheduling information (step S43). The SCI is a sort of control information. The SCI can be transmitted by being included in the scheduling information or can be transmitted through a control channel (e.g., PUSICH) provided independently from a control channel through which scheduling information is transmitted.

The BS transmits new uplink scheduling information #2 that is different from the uplink scheduling information #1 (step S44). However, a reception error occurs in both the SCI and the uplink scheduling information #2, and thus the UE fails to decode the SCI and the uplink scheduling information #2 Since no information regarding scheduling can be obtained, the UE transmits a new scheduling request to the BS (step S45).

In response thereto, the BS transmits the SCI by setting the SCI to 'changed' (step S46), and transmits the changed new uplink scheduling information #2 (step S47). The UE transmits HARQ data #2 that is next data of the HARQ data #1 by using the transmitted new uplink scheduling information #2 (step S48).

That is, when an error occurs in both the uplink scheduling information and the SCI, the UE can handle the error through a scheduling request. Of course, the method of FIG. 7 in which the UE handles the error through the scheduling request can also equally apply to a case where an error occurs in the uplink scheduling information and does not occur in the SCI.

Figure 8:
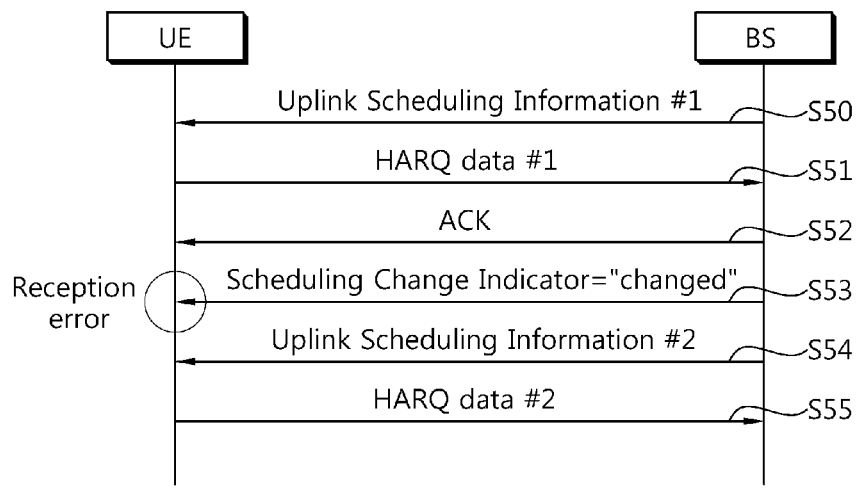
FIG. 8 is a flow diagram showing a method for handling an error of an SCI according to another embodiment of the present invention.

FIG. 8 is a flow diagram showing a method for handling an error of an SCI according to another embodiment of the present invention. FIG. 8 shows an error handling method in a case where an error exists in the SCI and does not exist in uplink scheduling information.

Referring to FIG. 8, a BS transmits uplink scheduling information #1 to a UE (step S50). The UE transmits HARQ data #1 to the BS (step S51). The BS successfully receives the HARQ data #1 and thus transmits ACK to the UE (step S52). The BS transmits an SCI by setting the SCI to 'changed' so as to indicate a change of the uplink scheduling information (step S53). The SCI is a sort of control information, the SCI can be transmitted by being included in the scheduling information or can be transmitted through a control channel (e.g., PUSICH) provided independently from a control channel through which scheduling information is transmitted.

The BS transmits new uplink scheduling information #2 that is different from the uplink scheduling information #1 (step S54). The UE fails to receive the SCI and successfully receives the uplink scheduling information #2. As a result, the UE fails to decode the SCI. Since the UE successfully receive the uplink scheduling information #2 even if the UE fails to decode the SCI, in this case, irrespective of whether the uplink scheduling information #2 is the same as the uplink scheduling information #1, the UE can handle an error by transmitting next HARQ data by using the uplink scheduling information #2. That is, the UE does not have to additionally transmit a scheduling request to the BS.

Therefore, the UE transmits HARQ data #2 that is next data of the HARQ data #1 by using the transmitted new uplink scheduling information #2 (step S55).

Figure 9:
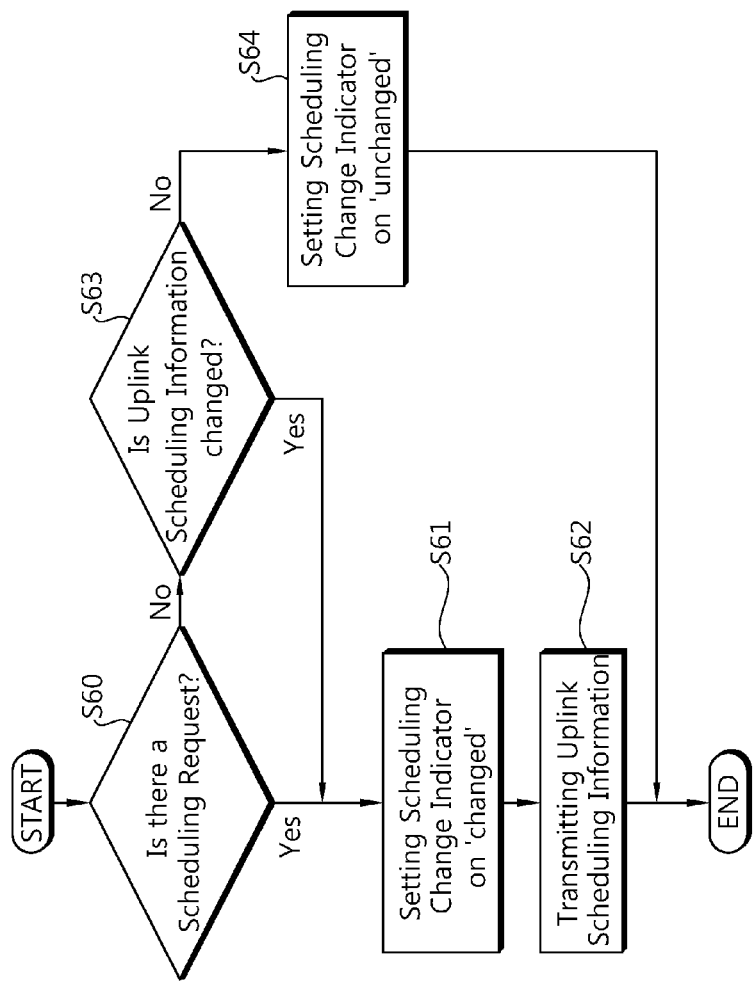
FIG. 9 is a flowchart showing a method for handling a reception error of an SCI by a BS according to an embodiment of the present invention.

FIG. 9 is a flowchart showing a method for handling a reception error of an SCI by a BS according to an embodiment of the present invention.

Referring to FIG. 9, the BS determines whether there is a scheduling request from a UE (step S60). If there is the scheduling request, the BS sets the SCI to 'changed' (step S61), and transmits new uplink scheduling information to the UE (step S62).

If there is no scheduling request, the BS determines whether the uplink scheduling information for the UE is changed (step S63). Whether the uplink scheduling information is changed may be determined using at least one of information included in the uplink scheduling information (e.g., a modulation and coding scheme, MIMO information, etc.) and information regarding a resource allocation state. If the uplink scheduling information is not changed, the BS sets the SCI to 'unchanged' (step S64), and transmits the SCI.

If the uplink scheduling information is changed, the BS sets the SCI to 'changed' (step S61), and transmits new uplink scheduling information (step S62).

Figure 10:
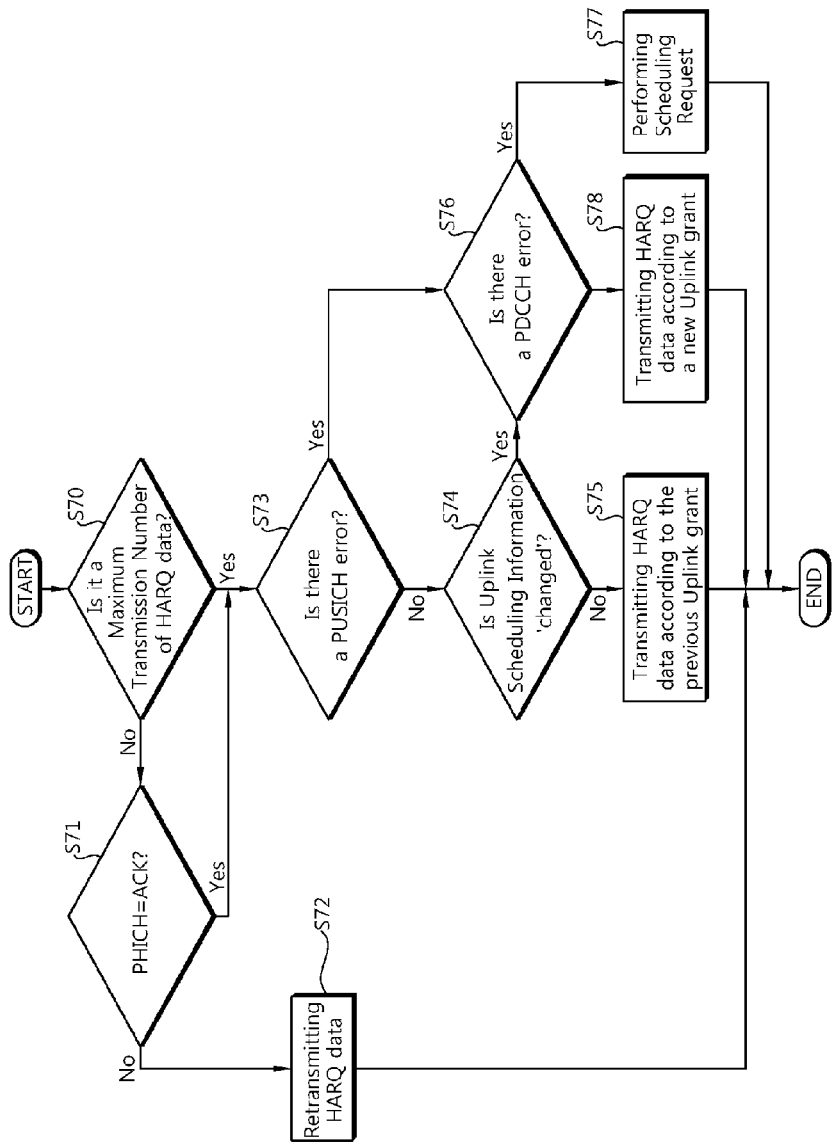
FIG. 10 is a flowchart showing a method for handling a reception error of an SCI by a UE according to an embodiment of the present invention.

FIG. 10 is a flowchart showing a method for handling a reception error of an SCI by a UE according to an embodiment of the present invention.

Referring to FIG. 10, before transmitting HARQ data, it is determined whether transmission is performed by a maximum transmission number of the HARQ data (step S70). If the HARQ data is transmitted by a transmission number less than the maximum transmission number, it is determined whether an ACK/NACK signal transmitted through a PHICH is ACK or NACK (step S71). If the ACK/NACK signal is NACK, the HARQ data is retransmitted by using a previous uplink grant (step S72).

If the ACK/NACK signal is ACK or if the HARQ data is transmitted by the maximum transmission number, it is determined whether there is an error in a PUSICH (step S73). If there is no error in the PUSICH, it is determined whether the SCI indicates 'changed' (step S74). If the SCI indicates 'unchanged', the HARQ data is transmitted according to a previously received uplink grant (step S75).

If the SCI indicates 'changed' or if it is determined that there is an error in the PUSICH, it is determined whether there is an error in a PDCCH (step S76). If there is the error in the PDCCH, the UE transmits a scheduling request to the BS (step S77). If there is no error in the PDCCH, the UE transmits the HARQ data according to a new uplink grant received from the PDCCH (step S78).

If it is assumed that an uplink grant and a downlink grant are continuously transmitted through the PDCCH, in order to provide services to up to 8 UEs in one TTI, 840 bits are required, that is, {46 bit(uplink grant)+59 bit(downlink grant)}×8(the number of UEs)=840 bits. According to the number of OFDM symbols and a frequency band (or the number of subcarriers) in the PDCCH, the number of available resource elements (REs) is as shown in Table 1 below.

TABLE 1

| frequency bandwidth | OFDM symbol 1 | OFDM symbol 2 | OFDM symbol 3 |
|---|---|---|---|
| 20 MHz | 1160 REs | 2360 REs | 3560 REs |
| 10 MHz | 560 REs | 1160 REs | 1760 REs |
| 5 MHz | 260 REs | 560 REs | 860 REs |

Referring to Table 1, if one OFDM symbol exists at a bandwidth of 20 megahertz (MHz), then the number of available REs is 1160, that is, 12 (the number of REs included in one resource block)×100 (the number of resource blocks included in the bandwidth of 20 MHz)×1 (the number of OFDM symbols)−16 (the number of REs consumed in PCFICH)−24 (the number of REs consumed in PHICH) =1160 REs.

Therefore, when an uplink grant and a downlink grant are transmitted in every TTI, if a rate of coding is 1/6, 2520 REs cannot be carried on one OFDM symbol at the bandwidth of 20 MHz.

When the uplink grant and the downlink grant are transmitted in every TTI as in the conventional technique, a required number of REs can be calculated according to a rate of coding as follows (when services are provided to 8 UEs). When the rate of coding is 1/3, 1260 REs (i.e., 552 REs for the uplink grant and 708 REs for the downlink grant) are required, that is, 840 bit×3 (the rate of coding/2(modulation order)=1260. Likewise, if the rate of coding is 1/6, 2520 REs are required, and if the rate of coding is 1/12, 5040 REs (i.e., 2208 REs for the uplink grant and the 2832 REs for the downlink grant) are required.

On the other hand, when the PUSICH of the present invention is used, if the rate of coding is 1/12, only 96 REs are required for the uplink grant, that is, 8 bit(the number of UEs)×12(the rate of coding)=96. In addition, when the PDSICH is used, only 576 REs are required for the downlink grant, that is, 8 bit(the number of UEs)×6 bit(UE identification information)×12(rate of coding)=576. Accordingly, limited radio resources can be effectively used to transmit control information.

Hereinafter, a method for transmitting downlink scheduling information will be described. In an asynchronous HARQ such as downlink transmission, there is no guarantee that an HARQ process is periodically performed. Therefore, a UE first checks for an HARQ channel ID assigned to the UE and thereafter performs the HARQ process. A downlink HARQ redundancy version (RV) can be constantly increased in a circular buffer format. The downlink scheduling information may be a downlink grant and may be control information transmitted through a PDCCH. In downlink transmission of the conventional technique, unlike the uplink grant, the downlink grant is transmitted by a BS through the PDCCH every time irrespective of whether the UE feeds back ACK or NACK, which may result in generation of an overhead in a resource of the PDCCH.

Figure 11:
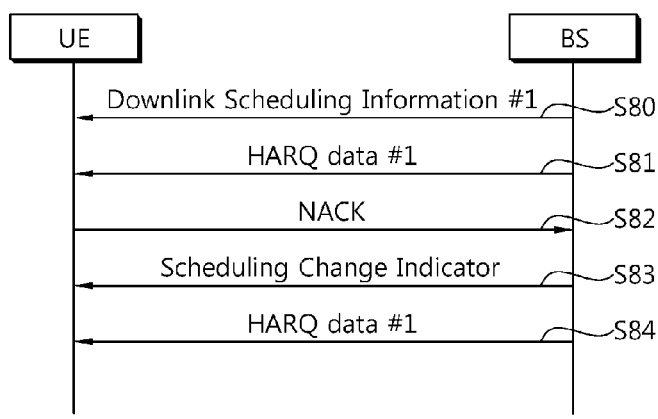
FIG. 11 is a flow diagram showing a method for transmitting downlink scheduling information according to an embodiment of the present invention.

FIG. 11 is a flow diagram showing a method for transmitting downlink scheduling information according to an embodiment of the present invention. FIG. 11 shows a case where a BS transmits HARQ data #1 in downlink and a UE transmits NACK in uplink after failing to receive the HARQ data #1.

Referring to FIG. 11, the UE receives downlink scheduling information #1 from the BS (step S80), and receives the HARQ data #1 according to the downlink scheduling information #1 (step S81). As described above, the downlink scheduling information #1 may be a downlink grant, and can be transmitted through a PDCCH that is a physical channel. The downlink scheduling information #1 may include at least one of a modulation and coding scheme for the HARQ data #1, MIMO information, information regarding radio resource allocation for data transmission, and an HARQ channel ID. The HARQ data #1 may be a MAC PDU.

The UE fails to receive the HARQ data #1 and thus transmits NACK to the BS (step S82). An ACK/NACK signal can be transmitted using an ACK/NACK channel that is a physical channel. The BS performs scheduling again to retransmit the HARQ data #1. As a result of performing scheduling, downlink scheduling information that is the same as previously transmitted downlink scheduling information #1 can be generated. In this case, instead of retransmitting the downlink scheduling information that is the same as downlink scheduling information #1, the BS transmits only an SCI (step S83).

In downlink scheduling, the SCI is information indicating whether downlink scheduling information is changed from previous downlink scheduling information. The SCI may be UE identification information. The UE identification information is identification information for identifying a plurality of UEs connected to the BS (or belongs to the same cell). The UE identification information is a user signature assigned from the BS when a radio resource control (RRC) connection is established between the UE and the BS. The UE identification information may be a radio network temporary identifier (RNTI) to be masked on a cyclic redundancy check (CRC). For example, when there is a change in the downlink scheduling information, the BS masks an RNTI for a specific UE on a CRC of a MAC PDU to transmit the masked RNTI to the specific UE, and transmits new downlink scheduling information. The specific UE demasks the MAC PDU by using the RNTI of the UE. If demasking is successful, the downlink scheduling information can be decoded, and thus the UE can receive downlink HARQ data according to the new downlink scheduling information.

For another example, if there is no change in the downlink scheduling information, the BS does not mask the RNTI of the specific UE on the CRC of the MAC PDU, and does not transmit the downlink scheduling information. The UE can know that there is no change in the downlink scheduling information by the fact that demasking is not performed with the RNTI of the UE.

In addition to the UE identification information, the SCI may be control information that is additionally signaled to indicate whether the downlink scheduling information is changed. Meanwhile, a specific new RNTI (e.g., SCI_RNTI) may be used to transmit the SCI. In this case, whether scheduling is changed can be reported to a plurality of UEs in a bitmap format, and then the RNTI can be masked. For example, in case of a bitmap of 110010, each bit corresponds to UE1, UE2, UE3, UE4, UE5, and UE6 respectively, from the left. Since the SCI is 1 for the UE1, UE2, and UE5, it can be seen that scheduling information thereon is changed. On the other hand, since the SCI is 0 for the UE2, UE4, and UE6, it can be seen that scheduling information thereon is unchanged.

The SCI may be control information received through a physical downlink scheduling indicator channel (PDSICH) that is a downlink physical channel. The SCI may be received together with other control information through a specific control channel. The BS may transmit the PDSICH by adding UE identification information on a specific UE into the PDSICH or by removing the UE identification information from the PDSICH so as to report whether downlink scheduling information for the specific UE is unchanged or changed from previous downlink scheduling information.

For example, assume that UEs A and B are connected to the same BS, {a} is UE identification information of the UE A, and {b} is UE identification information of the UE B. In addition, assume that the BS transmits downlink scheduling information SA1 for the UE A and downlink scheduling information SB1 for the UE B at a first TTI, and downlink scheduling information SA1 for the UE A and downlink scheduling information SB2 for the UE B are generated at a second TTI. In the first and second TTIs, the same downlink scheduling information SA1 is transmitted for the UE A and different downlink scheduling information is transmitted for the UE B (i.e., SB1≠SB2). Therefore, the BS transmits the UE identification information {a} and does not additionally transmit the downlink scheduling information SA1 for the UE A. For the UE B, the BS transmits new downlink scheduling information SB2.

That is, if the first downlink scheduling information of the first TTI is the same as the new second downlink scheduling information of the second TTI, the BS transmits only UE identification information that occupies much less resources without having to additionally transmit the second downlink scheduling information at the second TTI. Otherwise, if the first downlink scheduling information of the first TTI is different from the new second downlink scheduling information of the second TTI, the BS does not transmit the UE identification information at the second TTI but transmits the second downlink scheduling information.

Although UE identification information for one UE consists of 6 bits herein, it may be greater or less than 6 bits according to a system. For example, if the UE identification information consists of 6 bits and if the BS provides services to 4 UEs, the BS transmits 32 bits (i.e., 4×8(bit)). That is, if the BS can cover UEs 0 to 8, a field for the PDSICH can be variably configured with 0 bit to 48 bits. When the UE identification information is transmitted through the PDSICH, the PDSICH is variably assigned to a control region other than a physical control format indicator channel (PCFICH), a physical hybrid-ARQ indicator channel (PHICH), and a physical uplink scheduling indicator channel (PUSICH), and the remaining regions can be assigned to a PDCCH for transmitting a downlink grant that is downlink scheduling information.

The BS transmits the HARQ data #1 to the UE according to the downlink scheduling information #1 (step S84).

Figure 12:
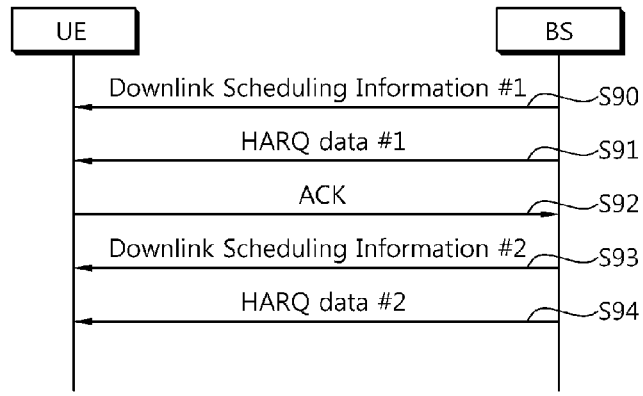
FIG. 12 is a flow diagram showing a method for transmitting downlink scheduling information according to another embodiment of the present invention.

FIG. 12 is a flow diagram showing a method for transmitting downlink scheduling information according to another embodiment of the present invention. FIG. 12 shows a case where a BS transmits HARQ data #1 in downlink and a UE transmits ACK in uplink after successfully receiving the HARQ data #1. In the following description, it is assumed that an SCI is UE identification information.

Referring to FIG. 12, the BS transmits downlink scheduling information #1 to the UE (step S90), and transmits the HARQ data #1 according to the downlink scheduling information #1 (step S91). The UE successfully receives the HARQ data #1 and thus transmits ACK (step S92). The BS transmits new downlink scheduling information #2 (step S93), and transmits HARQ data #2 according to the downlink scheduling information #2 (step S94). Since the downlink scheduling information #1 and the downlink scheduling information #2 are different from each other, the BS transmits only the downlink scheduling information #2 instead of transmitting the UE identification information. If the UE transmits ACK, the downlink scheduling information #1 and the downlink scheduling information #2 do not have to be different from each other and thus may be equal to each other. However, if the downlink scheduling information #1 and the downlink scheduling information #2 are equal to each other, the BS transmits the UE identification information instead of transmitting the downlink scheduling information #2.

When a rate of coding is 1/12 and the number of UEs in use is 8, if downlink scheduling information is transmitted every time, 2832 REs are consumed. On the other hand, as described above, if the UE identification information and the downlink scheduling information are alternately transmitted in a proper manner, the downlink scheduling information can be reported to the UE by using only 576 REs.

Figure 13:
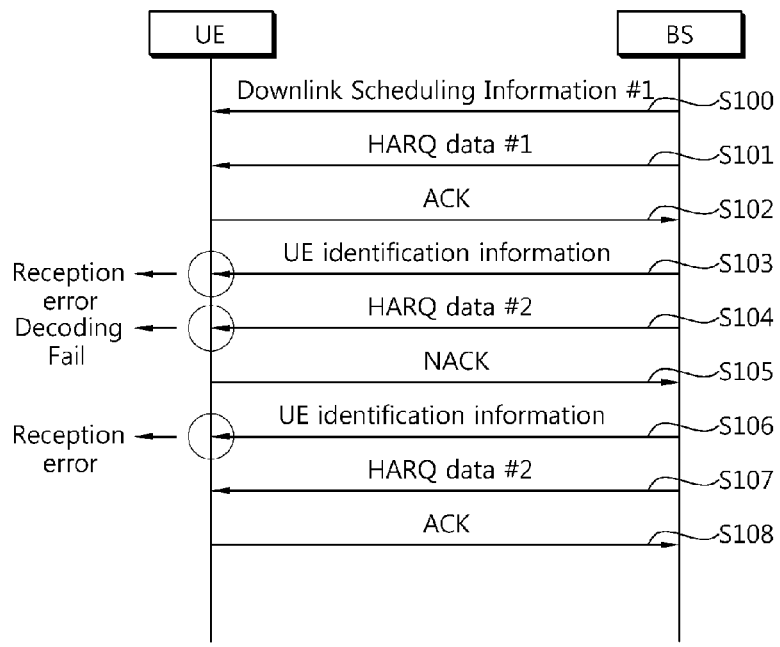
FIG. 13 is a flow diagram showing a method for handling a reception error of downlink scheduling information according to an embodiment of the present invention.

FIG. 13 is a flow diagram showing a method for handling a reception error of downlink scheduling information according to an embodiment of the present invention. FIG. 13 shows a case where no error occurs in initial transmission of downlink scheduling information.

Referring to FIG. 13, a BS transmits downlink scheduling information #1 (step S100), and transmits HARQ data #1 according to the downlink scheduling information #1 (step S101). In this case, RV=0. The downlink scheduling information #1 may be a downlink grant transmitted through a PDCCH. The downlink grant may include at least one of an MCS level, MIMO information, and information regarding a resource allocation state. The UE successfully receives the HARQ data #1 and thus transmits ACK (step S102).

The BS transmits UE identification information (step S103), and transmits HARQ data #2 on the basis of the downlink scheduling information #1 (step S104). As described above, the BS transmits the UE identification information because downlink scheduling information to be transmitted by the BS is the same as the downlink scheduling information #1. The UE identification information can be transmitted through a PDSICH.

However, a reception error occurs in the UE identification information (or a CRC error occurs in the UE identification information), and also a CRC error occurs in a PDCCH that is a channel for transmitting the downlink scheduling information. In this case, the UE has to determine whether to receive the HARQ data #2 by using the downlink scheduling information #1 previously successfully received or by using new downlink scheduling information to be transmitted from the BS in a next TTI. Since the UE has already correctly received the downlink scheduling information #1 and has successfully demodulated and decoded the HARQ data #1, the UE attempts to demodulate and decode the HARQ data #2 by using the downlink scheduling information #1.

However, the UE fails to demodulate and decode the HARQ data #2 by using the downlink scheduling information #1, and thus transmits NACK to the BS (step S105). Upon receiving NACK, since there is no change in previous scheduling information, the BS retransmits the UE identification information (S106) and retransmits the HARQ data #2 (S107). The HARQ data #2 is transmitted by using the downlink scheduling information #1, and thus the UE can successfully demodulate and decode the HARQ data #1 on the basis of the downlink scheduling information #1. Therefore, the UE transmits ACK to the BS (step S108).

Figure 14:
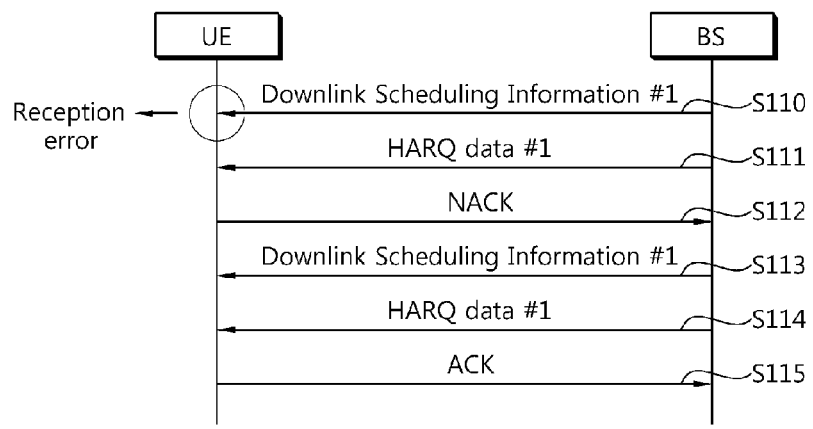
FIG. 14 is a flow diagram showing a method for handling a reception error of downlink scheduling information according to another embodiment of the present invention.

FIG. 14 is a flow diagram showing a method for handling a reception error of downlink scheduling information according to another embodiment of the present invention. FIG. 14 shows a case where an error occurs when downlink scheduling information is initially transmitted.

Referring to FIG. 14, a BS transmits downlink scheduling information #1 (step S110), and transmits HARQ data #1 according to the downlink scheduling information #1 (step S111). In this case, RV=0. The downlink scheduling information #1 may be a downlink grant transmitted through a PDCCH. The downlink grant may include at least one of an MCS level, MIMO information, and information regarding a resource allocation state. The UE transmits NACK since a reception error occurs in the downlink scheduling information #1 (step S112). Of course, the reception error may also occur in the HARQ data #1.

The BS retransmits the downlink scheduling information #1 (step S113), and retransmits the HARQ data #1 on the basis of the downlink scheduling information #1 (step S114). In this case, RV=1 because the HARQ data #1 is retransmitted. When a reception error occurs in downlink scheduling information, the UE cannot know which downlink scheduling information will be used to receive the HARQ data again. Thus, the BS continuously transmits the same downlink scheduling information until the UE transmits ACK. If the UE successfully receives the downlink scheduling information #1, the UE transmits ACK (step S115). Unlike in FIG. 13, receiving of the initial downlink scheduling information #1 is unsuccessful in FIG. 14, and thus the UE has to continuously receive new downlink scheduling information. When scheduling information is changed and thus the BS transmits downlink scheduling information, the BS has to continuously transmit downlink scheduling information until it is confirmed whether the UE receives the information without errors. When ACK is received, it can be determined that the UE receives the downlink scheduling information without errors.

Figure 15:
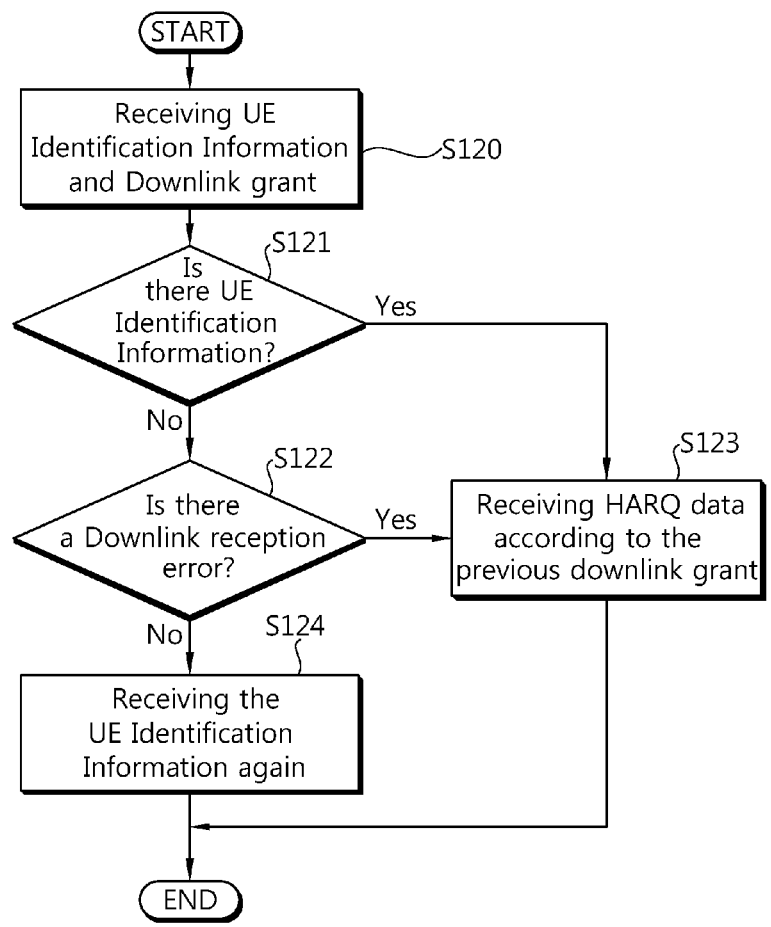
FIG. 15 is a flowchart showing a method for receiving downlink scheduling information by a UE according to an embodiment of the present invention.

FIG. 15 is a flowchart showing a method for receiving downlink scheduling information by a UE according to an embodiment of the present invention.

Referring to FIG. 15, the UE receives UE identification information from a BS through a PDSICH, and receives a downlink grant through a PDCCH (step S120). The UE determines whether there is UE identification information for the UE (step S121). To decode the PDSICH, the UE performs blind detection on the PDSICH having a length corresponding to any one of 0, 8, 16, 24, 32, 40, and 48 bits (when it is assumed that the BS can cover up to 8 UEs). This is because a size of the PDSICH is flexible since UE identification information for a specific UE can be added to or removed from the PDSICH. If the UE performs blind detection, power consumed in data processing of the UE can be reduced and a processing speed can also be reduced.

If the UE identification information does not exist in the PDSICH or if receiving of the UE identification information is unsuccessful due to a CRC error occurring in the PDSICH, the UE determines whether there is a reception error in a downlink grant (step S122). If there is no reception error in the downlink grant, the UE receives again the UE identification information transmitted in a next TTI according to the downlink grant (step S124).

If the reception error exists in the downlink grant, the UE receives HARQ data from the BS by using the previously received downlink grant (step S123). In addition, if UE identification information exists and if there is no reception error in the UE identification information received by the UE, the UE receives HARQ data according to the previously received downlink grant (step S123).

The present invention has advantageous features of dynamic scheduling (i.e., easy change of a position and size of a resource and an MCS) and also has advantageous features of static scheduling (i.e., optimization of a physical control channel).

Figure 16:
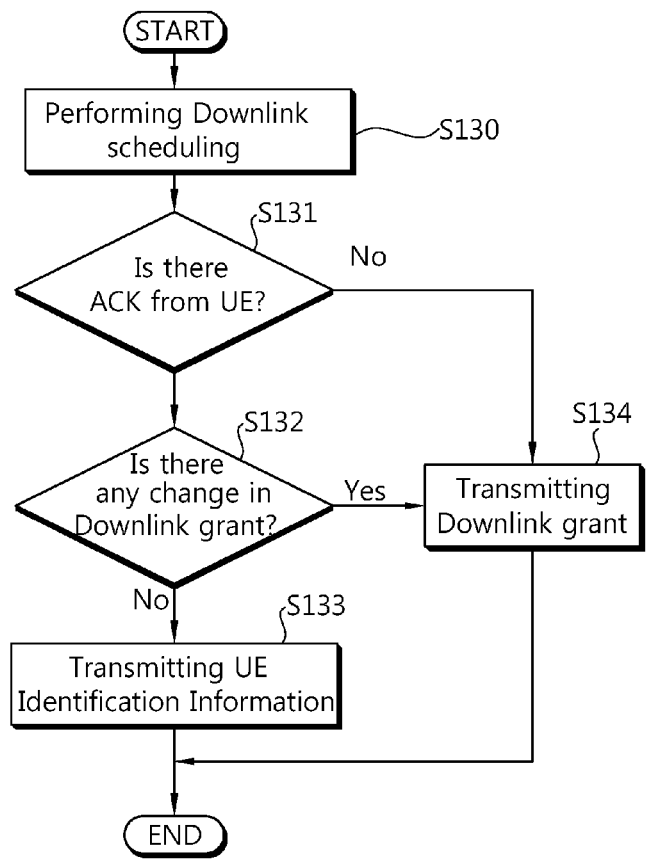
FIG. 16 is a flowchart showing a method for transmitting downlink scheduling information by a BS according to an embodiment of the present invention.

FIG. 16 is a flowchart showing a method for transmitting downlink scheduling information by a BS according to an embodiment of the present invention.

Referring to FIG. 16, the BS performs downlink scheduling (step S130). The BS determines whether ACK is transmitted from a UE in response to a downlink grant previously transmitted by the BS through a PDCCH or HARQ data transmitted through a PDSCH (step S131). If it is determined that ACK is transmitted from the UE, the BS determines whether a downlink grant generated by downlink scheduling is changed from the downlink grant previously transmitted by the BS (step S132).

If there is no change in the downlink grant, the BS transmits UE identification information to the UE through a PDSICH (step S133). If there is a change in the downlink grant, the BS transmits the downlink grant through the PDCCH (step S134). When the BS performs downlink scheduling (step S130), even if NACK is transmitted from the UE instead of ACK (step S131), the BS transmits the downlink grant (step S134).

As such, by transmitting either the downlink grant or the UE identification information to the UE according to a situation (herein, a size of resource occupied by the UE identification information is significantly smaller than the downlink grant), it is possible to avoid a situation where the BS incorrectly performs resource scheduling when limited radio resources are consumed in a downlink physical control channel.

All functions described above may be performed by a processor such as a micro-processor, a controller, a micro-controller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting data using a hybrid automatic repeat request (HARQ), the method comprising:
   receiving scheduling information from a base station, the scheduling information comprising information regarding a first radio resource;
   transmitting data to the base station by using the first radio resource;
   receiving a scheduling change indicator which indicates whether the first radio resource is reused or not from the base station through a physical uplink scheduling indicator channel (PUSICH), the PUSICH being configured with bits corresponding to a number of user equipments (UEs) processed in one transmission time interval (TTI), each UE being identified by performing bit-shifting on a demodulation reference signal (DMRS) index; and
   retransmitting the data or transmitting new data to the base station by reusing the first radio resource if the scheduling change indicator indicates that the first radio resource is reused, or
   transmitting the new data to the base station by using a second radio resource if the scheduling change indicator indicates that the first radio resource is not reused, wherein the scheduling change indicator is control information different from the scheduling information.

2. The method of claim 1 further comprising:
receiving the scheduling information comprising information regarding the second radio resource from the base station if the scheduling change indicator indicates that the first radio resource is not reused.

3. The method of claim 1, wherein the data includes a redundancy version (RV) indicating a number of retransmission attempts.

4. The method of claim 1, wherein the scheduling information is uplink scheduling information and is received through a physical downlink control channel (PDCCH).

5. The method of claim 1, wherein the scheduling information further comprises information regarding modulation and coding of the data.

6. The method of claim 1, wherein the data is HARQ data transmitted according to an HARQ scheme.

7. A method for transmitting data using scheduling information, the method comprising:
transmitting to a user equipment the scheduling information, the scheduling information comprising information regarding a first radio resource to be allocated;
transmitting the data to the user equipment by using the first radio resource;
transmitting a scheduling change indicator indicating whether the first radio resource is reused or not to the user equipment through a physical downlink scheduling indicator channel (PDSICH), the PDSICH being configured with bits corresponding to a number of user equipments (UEs) processed in one transmission time interval (TTI), each UE being identified by performing bit-shifting on a demodulation reference signal (DMRS) index; and
retransmitting the data or transmitting new data to the user equipment by reusing the first radio resource if the scheduling change indicator indicates that the first radio resource is reused, or
transmitting the new data to the user equipment by using a second radio resource if the scheduling change indicator indicates that the first radio resource is not reused.

8. The method of claim 7, wherein the scheduling change indicator is user equipment identification information for identifying user equipments in the same cell.

9. The method of claim 8, wherein the user equipment identification information is a user signature assigned from a base station when a radio resource control (RRC) connection is established.

10. The method of claim 7, wherein the scheduling information is downlink scheduling information and is received through a PDCCH.

* * * * *